UNITED STATES PATENT OFFICE 2,441,935

IMIDAZOLIDONES AND METHOD FOR THEIR MANUFACTURE

Robert Duschinsky, Essex Fells, N. J., assignor to Hoffmann-La Roche Inc., Nutley, N. J., a corporation of New Jersey No Drawing. Application March 14, 1946, Serial No. 654,509

13 Claims. (Cl. 260—309)

This invention relates to the hydrogenation of diacyl imidazolone compounds to imidazolidone derivatives, as well as to the novel products produced by this process.

My process involves the hydrogenation of compounds of the general formula "A"

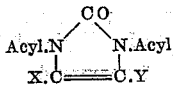

in which X and Y are hydrogen, alkyl, or a substituent which contains a reducible radical attached to the carbon atom in α-position to the ring nucleus, there being at least one such substituent containing such reducible radical, X and Y not necessarily being identical. By "reducible radical," as used in the specification and claims, is meant a radical which is susceptible to hydrogenation or hydrogenolysis.

The acyl radical may be a lower aliphatic acyl group, such as acetyl or propionyl. The reducible radical attached to the α-carbon of a substituent X and/or Y may be a radical, such as, oxo, hydroxy, phenyl, acetoxy, or the like.

The hydrogenation of the compounds of the general formula "A" is carried out selectively whereby the double bond in the imidazolone ring is saturated to form the corresponding imidazolidone ring, prior to a hydrogenation or hydrogenolysis of X and/or Y. The hydrogenation may, if desired, be carried to the extent not only of saturating the ring, but also of partially reducing reducible radicals in the substituent X and/or Y. For example, a keto group attached to the imidazolidone ring may be converted to the corresponding hydroxymethylene group.

For the purpose of this hydrogenation, I have found that palladium catalysts are particularly suitable. However, platinum and nickel catalysts may also be employed.

By my novel selective hydrogenation method, compounds of the general formula "A" are converted into corresponding imidazolidone compounds of the general formula "B"

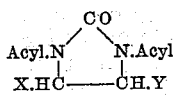

in which X and Y are hydrogen, alkyl, or a substituent which contains a reducible radical attached to the carbon atom in α-position to the ring nucleus, there being at least one such substituent containing such reducible radical, X and Y not necessarily being identical.

Compounds of the general formula "B" may be hydrolyzed to remove the acyl groups to yield compounds of the general formula "C"

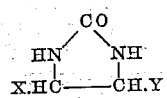

wherein X and Y correspond to the nomenclature applicable to compounds of the formula "B." The hydrolysis may follow the hydrogenation without intermediate isolation of the hydrogenated products "B."

If desired, the compounds of general formula "C" may be subjected to further hydrogenation for the purpose of reducing reducible radicals in X and/or Y.

The following examples are illustrative of methods carrying out my invention:

EXAMPLE 1

*1,3-diacetyl-4-α-hydroxy-benzyl-imidazolidone-2*

A mixture of 7.03 g. imidazolone-2 and 11.8 g. benzoyl chloride was reacted in 85 cc. nitrobenzene by addition of 22.2 g. aluminum chloride (2 moles) and heating for 4¼ hours at 55–60°. Benzoyl imidazolone was isolated by pouring on ice, washing with ether and was recrystallized from 400 cc. 50% ethanol. M. P. 313–316°.

The diacetyl derivative was prepared by twice refluxing 3.76 g. benzoyl-imidazolone with 50 cc. acetic anhydride followed by evaporation to dryness, and crystallization of the final residue in 150 cc. ethanol. M. P. 136–138°.

A solution of 4.1 g. diacetyl-benzoyl-imidazolone in 40 cc. acetic acid was hydrogenated for 1 hour under 2 atmospheres of pressure in the presence of 2.2 g. prehydrogenated charcoal catalyst containing 10% palladium. Evaporation of the filtered solution and treatment of the residue with ethanol, yielded 2.6 g. crystals, which were recrystallized from 50 volumes ethanol. M. P. 223°.

EXAMPLE 1A

*4-α-hydroxy-benzyl-imidazolidone-2*

To a solution of 274 mg. of the foregoing compound, in 15 cc. ethanol, was added 6 cc. 0.5 N barium hydroxide solution. After heating on a water bath for a few minutes, barium was eliminated by sulfuric acid. Evaporation of the solution and taking up with 5 cc. boiling water gave 100 mg. crystals, melting at 192.5–194°. This product can be sublimed in vacuo at 0.1 mm. and 200° (bath).

Example 2

4-methyl-5-α-hydroxy-benzyl-imidazolidone-2

4-methyl-imidazolone-2 is prepared by the following method:

34 grams 4-methyl-5-imidazolone-(2)-carboxylic acid ethyl ester were dissolved in 215 cc. of 0.93 N sodium hydroxide (1 mole) and the solution kept 68 hours at 50°–55°. After cooling it was neutralized to pH 7 by gradual addition of 37.5 cc. of 5 N hydrochloric acid, which was accompanied by much carbon dioxide evolution and crystallization of the reaction product. The mixture was stirred in an ice bath for 1 hour; the methyl-imidazolone-2 was filtered off and washed chlorine-free with some ice cold water. After drying in an oven at 60°, a first crop of 6.6 g. was obtained. M. P. 184°–192° C.

The mother liquor was concentrated in vacuo, while the pH, which had the tendency to increase, was adjusted to 7 by gradual addition of 7 cc. N hydrochloric acid, and was finally brought to dryness. The white residue was extracted 3 times with 35 cc. of boiling absolute ethanol, and once with 95% ethanol. The alcoholic extracts, after separation from the undissolved sodium chloride, were concentrated to dryness, thus yielding a second crop of 8.55 g. methyl-imidazolone-2 melting at about 178° C.

4-methyl-imidazolone-2 can also be prepared as described by Duschinsky and Dolan, J. A. C. S., 67, 2079 (1945).

19.6 g. 4-methyl-imidazolone-2 and 28.1 g. benzoylchloride were reacted in 150 cc. nitrobenzene with 53.2 g. aluminum chloride. The temperature was maintained at 60°–65° for 5½ hours. The reaction mixture was then treated with 200 cc. ether and 200 g. ice. Pinkish-brown crystals were obtained, which were washed with water and ether.

The crude product was recrystallized from 600 cc. boiling 50% ethanol, giving 31.7 g. of white, fluffy crystals melting at 255.5°–258°. The product is 4-methyl-5-benzoyl-imidazolone-2.

10.1 g. of 4-methyl-5-benzoyl-imidazolone-2 were refluxed for ½ hour with 80 cc. acetic anhydride. The mixture was evaporated to a yellow oil, which was again refluxed with 80 cc. acetic anhydride, and reconcentrated. Crystallization of the residue from 25 cc. ethanol yielded 12.2 g. of 1,3-diacetyl-4-methyl-5-benzoyl-imidazolone-2.

572 mg. of 1,3-diacetyl-4-methyl-5-benzoyl-imidazolone-2 were hydrogenated at room temperature and atmospheric pressure with 1 g. 10% palladium charcoal catalyst, in 15 cc. acetic acid. After two hours, the hydrogenation came to a standstill with an uptake of 97.5 cc. (theory for 2 moles, 90 cc.). The oily residue obtained, after filtering the catalyst and evaporation of the acetic acid, was dissolved in 6 cc. ethanol and hydrolyzed by letting it stand with 7.5 cc. N sodium hydroxide for two hours. The solution was neutralized toward methyl-orange with hydrochloric acid, and evaporated to dryness. The residue was extracted with ethanol. Evaporation of the ethanolic extract and taking up with water, gave crystals, which were purified by sublimation at 200° (bath) and 0.4 mm. M. P. 210–212°.

Example 3

4-methyl-5-benzyl-imidazolidone-2

4.4 g. of 4-methyl-5-benzoyl-imidazolone-2, prepared in accordance with Example 2, were hydrogenated with 2 g. 10% palladium charcoal in 25 cc. acetic acid. After 3¼ hours the hydrogen uptake came to a standstill (2 moles absorbed). The filtered solution gave upon evaporation and addition of 50% ethanol, 3.27 g. 4-methyl-5-benzyl-imidazolone-2 crystals melting at 290° in an evacuated capillary tube.

The diacetyl derivative was obtained in the usual manner by refluxing 7.61 g. of the foregoing with 60 cc. acetic anhydride and crystallizing from 20 cc. ethanol, yielding 8.4 g. M. P. 74.5–76.0°.

1.36 g. of the foregoing diacetyl compound was hydrogenated with 650 mg. of 10% palladium charcoal catalyst in 15 cc. acetic acid at room temperature and atmospheric pressure. The uptake came to a standstill after absorption of one mole. The residue obtained from the filtered and evaporated solution was hydrolyzed by letting it stand for 20 minutes with 10 cc. N sodium hydroxide and neutralized with 10 cc. N hydrochloric acid. The solution was evaporated to dryness. The residue extracted with ethanol; and this extract was evaporated to dryness. Treatment of the final residue with ether gave 540 mg. crystals, which were purified by recrystallization in water or by sublimation at 140° (bath) and 0.6 mm., M. P. 134–135°.

Example 4

4-methyl-5-imidazolidone-(2)-ε-keto-caproic acid 5.46 g. of 4-methyl-imidazolone-2 (preparation shown in Example 2) were suspended in 50 cc. of nitrobenzene. 11.1 g. (1.04 mole) of adipic acid monoethyl ester chloride were added, and the mixture stirred well in a three-neck flask fitted with an airtight mechanical stirrer and ascending condenser. With cooling in an ice bath, 15 g. (2 moles) of anhydrous aluminum chloride were added, which readily went into solution, accompanied by heat evolution. Then, with continuous stirring, the temperature was raised to 60°–65° C. and maintained there for five hours. At that time, the evolution of hydrochloric acid had completely stopped.

The reaction mixture was a brown, viscous liquid. It was treated with 50 g. of crushed ice and 100 cc. of ether, whereupon yellowish crystals separated which were washed chlorine- and nitrobenzene-free with water and ether. After drying at 100° in vacuo, 7.67 g. of the reaction product were obtained. M. P. 170° C. By recrystallization in 75 cc. of 50% ethanol, with addition of activated carbon, 6.73 g. of crystals, M. P. 171.5°–173° C., were obtained. The product was 4-methyl-5-imidazolone-(2)-ε-keto-caproic acid ethyl ester.

A solution of 50.8 g. 4-methyl-5-imidazolone-(2)-ε-keto-caproic acid ethyl ester in 200 cc. acetic anhydride was refluxed for 20 minutes. Most of the anhydride was then distilled off at atmospheric pressure. The residue was again refluxed with acetic anhydride, the solution was evaporated at atmospheric pressure and finally in vacuo. The solution of the brownish residual oil in 100 cc. ethanol deposited upon cooling the crystallized diacetyl derivative, which was filtered off and washed with cold ethanol. The yield was 56 g. M. P. 69.5°–70.5°. The alcoholic mother-liquor gave, upon concentration and refluxing the residue again with 25 cc. of acetic anhydride, a second crop of diacetyl-4-methyl-5-imidazolone-(2)-ε-keto-caproic acid ethyl ester, which was distilled at 0.6 mm. and 165° (bath temperature).

2.78 g. of 1,3-diacetyl-4-methyl-5-imidazolone-(2)-ε-keto-caproic acid ethyl ester in 20 cc. ethylacetate were hydrogenated at room temperature and at a pressure of 1500 lbs. for 17 hours in the presence of 4 g. prehydrogenated 2.5% palladium charcoal catalyst. The filtered solution was evaporated to a sirup, which was dissolved in 25 cc. ethanol and saponified with 75 cc. of 0.35 N barium hydroxide and by heating the mixture at 50° for 20 minutes. After elimination of the barium as sulfate, the solution was evaporated and the residue crystallized from water. Yield: 1.08 g. M. P. 147–149°.

EXAMPLE 5

*4-methyl-5-imidazolidone-(2)-hydroxy - caproic acid*

684 mg. of the compound, prepared in Example 4, and dissolved in 8 cc. glacial acetic acid, were hydrogenated at room temperature and atmospheric pressure in the presence of 300 mg. prehydrogenated platinum oxide. After 40 minutes, one mole hydrogen was absorbed and the uptake stopped. The filtered solution was evaporated, and the sirupy residue treated with alcohol, acetone and ether, in order to obtain 120 mg. crystals, which melted at 130–138°. This material was dissolved in 2 cc. ethanol and the solution filtered. A small quantity of oil was precipitated with ether and discarded.

(A) *High melting isomer.*—Addition of petroleum ether to the alcohol ether solution gave needles, which were recrystallized from dioxane and melted at 145–147.5°. Yield: 55 mg.

The mother liquor of the 120 mg. crude material gave upon standing in the ice box a second crop of 150 mg. Further recrystallization from dioxane and from water raised the melting point to 149–150°.

(B) *Low melting isomer.*—The mother liquor of the 150 mg. deposited, upon further standing in the ice box, crystals in form of rosettes, which were washed with a mixture of 1.5 cc. ethanol and 10 cc. ether. Yield: 70 mg. M. P. 104–108°.

EXAMPLE 6

*4-hydroxymethyl-5-imidazolidone-(2) ε-keto-caproic acid*

A solution in 165 cc. of carbon tetrachloride, of 50.7 g. diacetyl-4-methyl-5-imidazolone-(2)-ε-keto-caproic acid ethyl ester (see Example 4), was refluxed with 26.5 g. N-bromosuccinimide, until a sample of the mixture applied on moistened iodine starch paper gave no iodine coloration. As a rule the reaction was completed after 40 to 60 minutes. The cooled solution, filtered from the succinimide, gave, upon evaporation in vacuo, a crystalline mass, which was melted by warming on a water bath, and poured into 150 cc. of ether. Matted needles separated, which were washed with about 100 cc. ether. The yield was 56 g. M. P. 75°–76.5°. The product is quite soluble in benzene, dioxane, ethyl acetate, and acetic acid; less in ether and alcohol; insoluble in petroleum ether. It can be recrystallized from alcohol. The product is diacetyl-4-bromomethyl-5-imidazolone-(2)-ε-keto-caproic acid ethyl ester.

To a solution of 4.42 g. of this diacetyl-bromomethyl keto ester, in 50 cc. acetic acid, were added 1.77 g. of silver acetate, with stirring and heating to 55°, until the solution contained neither silver nor bromine ions. After separation from the silver bromide, the solution was evaporated and the almost colorless residue dried in vacuo at 100°. The yield was 3.5 g.; $n_D^{24}=1.4507$. The product is diacetyl-4-acetoxymethyl-5-imidazolone-(2)-ε-keto-caproic acid ethyl ester.

A solution of 17.3 g. of diacetyl-4-acetoxymethyl - 5 - imidazolone-(2)-ε-keto-caproic acid ethyl ester, in 70 cc. of ethylacetate, was hydrogenated in the presence of 18.9 g. of a catalyst containing 2.5% palladium on activated carbon at a pressure of 2000 lbs. and 60° C. for 15 hours. The catalyst was filtered off and extracted three times with 100 cc. of boiling ethylacetate. The filtrate and the three extracts were combined and evaporated to yield 13.6 g. of a light yellow oil. The hydrogenation was completed in acetic acid using either platinum oxide or palladium on activated carbon as a catalyst. Thus 9.6 g. of the oil, dissolved in 50 cc. of acetic acid were hydrogenated at room temperature in the presence of 5.8 g. of a prehydrogenated catalyst containing 10% palladium on activated carbon. After an uptake of 162 cc. of hydrogen in five hours, the hydrogenation was practically completed. The catalyst was filtered off and the solution evaporated in vacuo to yield 9.3 g. of oil, which was freed from acetic acid by drying over sodium hydroxide. This product, containing diacetyl-4-acetoxymethyl-5-imidazolidone-(2)-ε-keto-caproic acid ethyl ester, was dissolved in 60 cc. of ethanol, and saponified by the addition of 325 cc. 0.5 N barium hydroxide solution. After 1½ hours, the barium was precipitated with the equivalent amount of 1 N sulfuric acid.

The barium sulfate was filtered off, the filtrate was concentrated in vacuo to a sirup, treated with dioxane, and the solution distilled off in vacuo. This was repeated. The final residue was twice extracted with 20 cc. of boiling dry dioxane and twice with 20 cc. of boiling alcohol.

The dioxane and alcohol solutions deposited, on cooling, almost colorless needles, which were washed with dioxane and ether. By concentration, a second crop was obtained. M. P. about 140°. The product can be represented by the tautomeric formulae:

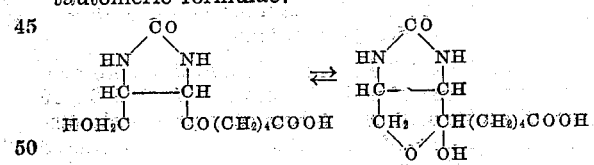

EXAMPLE 7

*4-hydroxymethyl-5-imidazolidone-(2)-ε-keto-caproic acid*

3.46 g. of diacetyl-4-acetoxymethyl-5-imidazolone-(2)-ε-keto-caproic acid ethyl ester, in 15 cc. ethylacetate containing 1% acetic acid, were hydrogenated with 15 g. moist Raney nickel as a catalyst, at 1000 p. s. i., and 50–70° for 3¾ hours. The Raney nickel catalyst was first washed with ethylacetate containing 1% acetic acid. After the hydrogenation, the catalyst was removed, and the product, containing diacetyl-4-acetoxymethyl-imidazolidone-(2)-ε-keto-caproic acid ethyl ester, was separated and saponified as described in Example 6, yielding the same product as in that Example.

EXAMPLE 8

*4-hydroxymethyl-5-imidazolidone-(2)-ε-keto-caproic acid*

19.6 g. of 4-methyl-imidazolone-2 were reacted under the conditions described in Example 4 with 35.7 g. adipic acid mono-methyl ester chloride, and 80 g. of aluminum chloride in 110 cc. nitrobenzene. 28 g. of 4-methyl-5-imidazolone-(2)-ε-keto-caproic acid methyl ester were obtained which, after recrystallization in water containing 5% methanol, melted at 176°.

12 g. of the foregoing compound were refluxed twice with 50 cc. propionic acid anhydride and evaporated to dryness. The residue was crystallized from 25 cc. ether. Yield: 14.8 g. M. P. 66°.

1.68 g. of the foregoing dipropionyl-4-methyl-5-imidazolone-(2)-ε-keto-caproic acid methyl ester were reacted with 0.88 g. bromosuccinimide in 10 cc. carbon tetrachloride in the manner described in Example 6 for the diacetyl-4-methyl-5-imidazolone-(2)-ε-keto-caproic acid ethyl ester. Yield 1.1 g. M. P. 58–61°.

To 2.52 g. of dipropionyl-4-bromomethyl-5-imidazolone-(2)-ε-keto-caproic acid methyl ester, thus obtained, dissolved in 25 cc. of acetic acid, were added 1.02 g. silver acetate. The mixture was heated to 50–55° and stirred until neither bromine nor silver was present in the solution. The solution was filtered to remove the silver bromide. The solution then contained dipropionyl-4-acetoxymethyl-5-imidazolone-(2)-ε-keto-caproic acid methyl ester. After addition of 1.25 g. of 10% palladium charcoal, suspended in 15 cc. acetic acid, thereto, the solution was hydrogenated for 22 hours at room temperature and atmospheric pressure. Filtration of the catalyst, and evaporation in vacuo, gave a yellowish oil. This was dissolved in 10 cc. ethanol, and saponified by letting it stand for 2 hours with 75 cc. 0.5 N barium hydroxide solution. Elimination of the barium with sulfuric acid, and evaporation in vacuo after filtering the barium sulfate, and boiling of the residue with 15 cc. dioxane, gave 90 mg. crystals of a substance which was identical with the 4-hydroxymethyl-5-imidazolidone-(2)-ε-keto-caproic acid obtained by hydrogenation of the corresponding diacetyl ethyl ester.

EXAMPLE 9

*4-hydroxymethyl-5-imidazolidone-(2)-ε-hydroxy-caproic acid*

A solution of 244 mg. of the hydroxy keto acid prepared according to Example 6, 7, or 8, in 10 cc. of acetic acid, which had been previously distilled over chromium trioxide, was hydrogenated at room temperature and atmospheric pressure in the presence of 100 mg. of prehydrogenated platinum oxide catalyst. After 23 hours, the theoretical amount of 24 cc. of hydrogen was absorbed. The catalyst was filtered off and the solution was evaporated in vacuo, leaving 230 mg. of a crystalline residue. Recrystallization from 2 cc. of ethanol yielded 100 mg. of colorless needles, melting at about 200°. These needles were then separated, and upon recrystallization, a product identified as 2'-keto-3,4-imidazolido-tetrahydrofurane-(2)-n-valeric acid was obtained. The alcoholic mother liquor obtained by the separation of the 100 mg. of needles gave upon addition of ether, 50 mg. of an unsharp melting crystalline material. This material was separated, and to the mother liquor there was added petroleum ether, which caused the deposition of 15 mg. of crystals which melted at 120–122°. This product is 4-hydroxymethyl-5-imidazolidone-(2)-ε-hydroxy-caproic acid.

It will be understood that the proportions of reactants, times of reaction, temperatures of reaction, and the like, may be varied; and that supplementary processes, such as purification, and the like, may be resorted to wherever found desirable or convenient. These and other variations and modifications will be evident to those skilled in the art in the light of the comprehensive guiding principles disclosed herewith. The products may be prepared and employed either in a pure or an impure state.

It is intended that the products can be prepared and used in their various tautomeric forms. Accordingly, whenever the formulae for the imidazolone nucleus and the imidazolidone nucleus are employed, as well as when the terms "imidazolone" and "imidazolidone" are set forth, in the specification and claims, all tautomeric forms are intended to be included therein. It will also be understood that all stereoisomers are included in the compounds disclosed and claimed herein. It is pointed out that isomers are also possible with respect to the position of the acyl groups. Thus, for example, while the specification and claims generally refer to diacyl in terms of 1,3-diacyl, it will be understood that the isomeric modifications shown by the following three formulae are contemplated as being within the scope of my invention. Acetyl derivatives are shown merely as illustrative for this purpose.

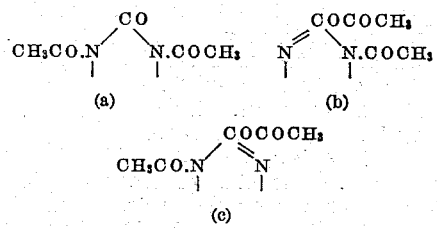

This application is a continuation-in-part of my applications Serial Nos. 607,915–6, filed July 30, 1945, which applications are, in turn, continuations-in-part of my copending application Serial No. 533,396, filed April 29, 1944, which has issued as Patent No. 2,397,250.

I claim:

1. An imidazolidone-2 compound of the general formula:

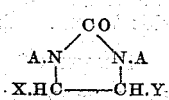

in which A is a member of the group consisting of hydrogen and acyl, and in which X and Y are members, not necessarily identical, selected from the group consisting of hydrogen, alkyl, and a lower aliphatic radical containing in the α-carbon atom to the ring nucleus a reducible radical, at least one of X and Y being such an aliphatic radical, said reducible radical being a member of the group consisting of oxo, hydroxy, phenyl and acetoxy.

2. A process which comprises hydrogenating a 1,3-diacyl-imidazolone-2 compound of the following formula:

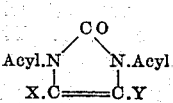

whereby an imidazolidone of the following formula is obtained:

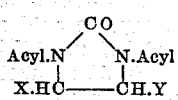

in which X and Y are members, not necessarily identical, selected from the froup consisting of hydrogen, alkyl and a lower aliphatic radical containing in the α-carbon atom to the ring nucleus a reducible radical, at least one of X and Y being such an aliphatic radical, said reducible radical being a member of the group consisting of oxo, hydroxy, phenyl and acetoxy.

3. 4-hydroxymethyl - 5 - imidazolidone -(2)- $\epsilon$-keto-caproic acid.

4. Diacetyl - 4 -acetoxymethyl - imidazolidone-(2)-$\epsilon$-keto-caproic acid ethyl ester.

5. 4-hydroxymethyl-5-imidazolidone-(2)-$\epsilon$-hydroxy-caproic acid.

6. Process of claim 2 in which the imidazolone compound is diacetyl-4-acetoxymethyl-5-imidazolone-(2)-$\epsilon$-keto-caproic acid ethyl ester.

7. The process of claim 2 which comprises hydrolyzing the resulting imidazolidone compound to replace acyl by hydrogen.

8. Process of claim 2 in which the imidazolone compound is diacetyl-4-acetoxymethyl-5-imidazolone-(2)-$\epsilon$-keto-caproic acid ethyl ester, and in which the resulting imidazolidone is hydrolyzed to yield 4-hydroxymethyl-5-imidazolidone-(2)-$\epsilon$-keto-caproic acid.

9. Process of claim 2 in which the imidazolone compound is diacetyl-4-acetoxymethyl-5-imidazolone-(2)-$\epsilon$-keto-caproic acid ethyl ester, and in which the resulting imidazolidone is hydrolyzed to yield 4-hydroxymethyl-5-imidazolidone-(2)-$\epsilon$-keto-caproic acid, and hydrogenating this imidazolidone product to obtain 4-hydroxymethyl-5-imidazolidone-(2)-$\epsilon$-hydroxy-caproic acid.

10. The process of claim 2 in which a palladium catalyst is employed during the hydrogenation.

11. Product of claim 1 in which the 1 and 3 substituents are acyl.

12. Product of claim 1 in which the 1 and 3 substituents are acetyl.

13. Product of claim 1 in which the 1 and 3 positions carry hydrogen.

ROBERT DUSCHINSKY.

REFERENCES CITED

The following references are of record in the file of this patent:

Jour. Biol. Chem., vol. 78 (1928), pages 758, 761.